Jan. 15, 1924.
L. KOWALAK
1,481,101
AUTO SIGNALING DEVICE
Filed Feb. 14, 1918
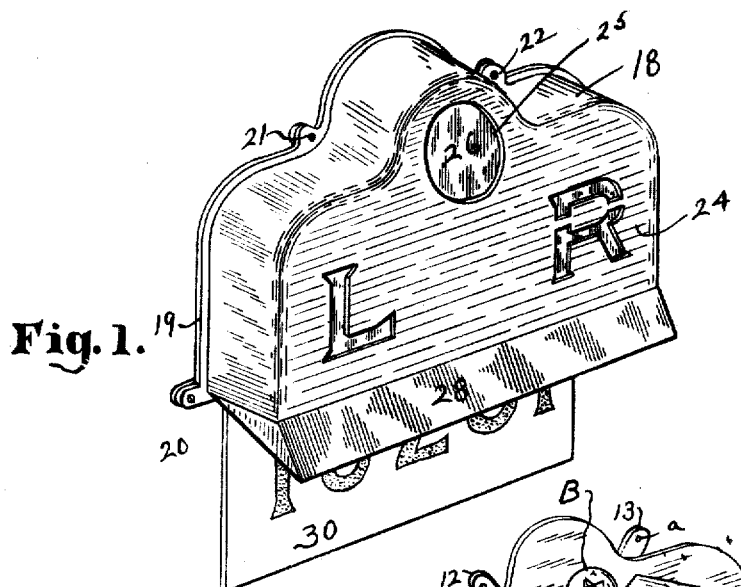
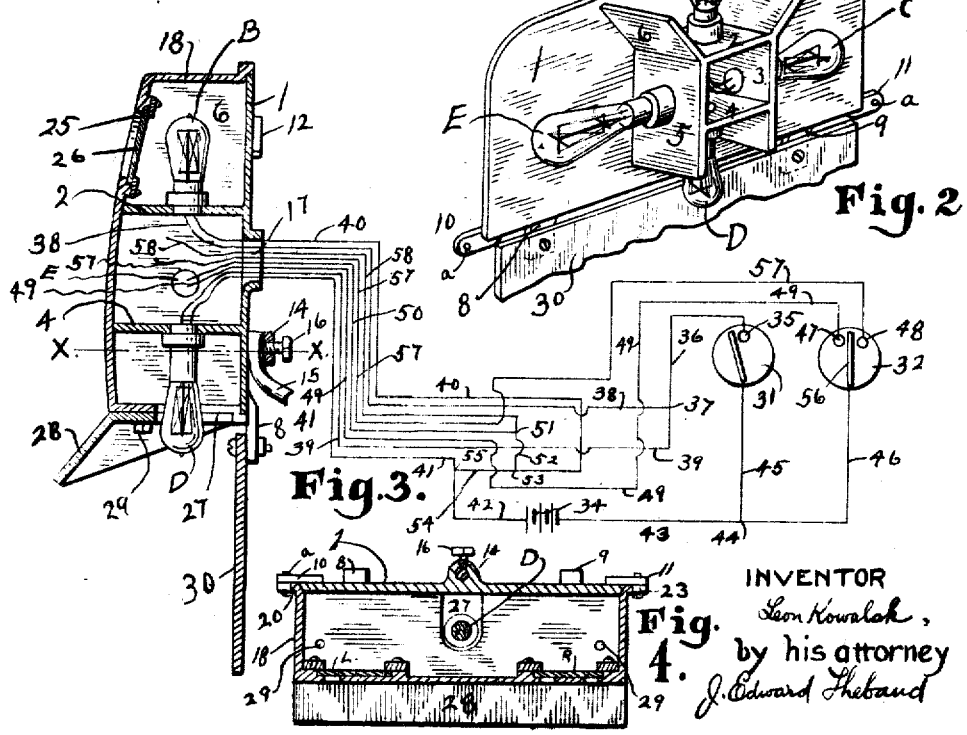
INVENTOR
Leon Kowalak,
by his attorney
J. Edward Theband Patented Jan. 15, 1924.

1,481,101

UNITED STATES PATENT OFFICE.

LEON KOWALAK, OF BUFFALO, NEW YORK.

AUTO SIGNALING DEVICE.

Application filed February 14, 1918. Serial No. 217,275.

*To all whom it may concern:*

Be it known that I, LEON KOWALAK, a citizen of the United States, residing at Buffalo, in the county of Erie and State of New York, have invented certain new and useful Improvements in Auto Signaling Devices; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to auto signaling devices, particularly those used on the rear of a vehicle to indicate the direction in which the operator is about to turn.

One of the objects of this invention is to provide a simply constructed device for carrying the signaling lamps and adapted to be mounted upon the rear of a vehicle.

Another object is to provide two sets of lamps, one set for signaling a right or a left turn and the other set to show the usual red rear signal or tail light, and to illuminate the number plate.

A further object is to provide an electric circuit, with lamps and switches for manually controlling the signals and the illumination of the number plate.

A further object is to provide a simple support for the lamps that will remain attached to the rear of the auto while the casing, which covers them is removed for repair or renewal of the lamps.

And a further object is to provide a rain shield for the number plate which will at the same time act as a reflector of light in illuminating the said plate.

With these and other objects my invention consists in certain construction, one embodiment of which is illustrated in the drawings and is hereinafter described, its operation is explained and what I claim is set forth.

In the drawings,

Figure 1 is a perspective view of a device embodying my invention, and adapted to be mounted upon the rear of a vehicle.

Figure 2 is a perspective view of the rear wall of my device showing partitioning walls separating the signals.

Figure 3 is a vertical mid-sectional view, taken at right angles to the face of the device. This figure also shows the wiring in connection with the lamps and switches.

Figure 4 is a horizontal section taken on the line X—X of Figure 3.

In the figures, the device is shown made up of the following parts, from a back plate 1, integrally projects a series of partition walls, respectively numbered 2, 3, 4 and 5, and two wing walls, respectively numbered 6 and 7. On the rear of the plate 1, and depending therefrom, are two number plate lugs 8 and 9. There are also four other lugs, numbered respectively 10, 11, 12 and 13, having threaded holes A, A, A, A, for the reception of screws, when attaching the outer casing. External to the plate 1 is another lug 14, adapted for the reception of a bracket arm attached to a vehicle, not shown, a fragment of which arm is numbered 15, shown in Figure 3, and held on by the screw 16. Positioned in the plate 1 and surrounded by partition walls 2, 3, 4 and 5, is a hole 17, for the passage of lamp wires. Fixed in each of the walls 2, 3, 4 and 5 is an electric lamp. These lamps are lettered B, C, D and E.

Adapted for attachment to the plate 1, is the outer shell 18, having a flange 19 and projecting lugs 20, 21, 22 and 23, positioned to come opposite the respective lugs 10, 12, 13 and 11. In the face 24 of the shell 18, is a round aperture 25 covered on the inside with a red glass 26. Other recesses cut in the shape of letters—L and R, and backed by a glass supported on the inside of the shell 18, are shown in Figure 1. In the bottom of the shell 18 is a recess 27. A similar recess, registering therewith is made in the beveled reflector plate 28, which plate is attached by screws 29, 29 to the shell 18. Depending from the lugs 8 and 9 is the number plate 30.

Referring particularly to Figure 3, there are shown switches 31 and 32, and a battery 34, all of which are in circuit with the set of lamps, B, C, D and E. This circuit may be described as follows: Lamps B and D are connected with the single switch 31, in the following manner, starting at the pole 35, a wire 36 passes on and branches at the point 37 into two wires 38 and 39. The wire 38 connects with the lamp B, and the wire 39 connects with the lamp D. Returning from the lamp B, is the wire 40, which connects with the return wire 41, coming from the lamp D, merging with the wire 42 and connected with the battery 34. Leading from the battery 34, is the wire 43, which branches at 44 to a wire 45 connected with the switch 31, and to the wire 46, connected with the switch 32. The switch 32 has two poles 47 and 48. From the pole 47 leads a wire 49, which connects with the lamp E. The return wire 50, connected with the lamp E, connects at 51 with the wire 52, which is connected at 53 with the wire 54, which in turn is connected at the point 55 with the battery wire 42, and by means of the wires 43 and 46 and the leaf 56, the circuit through the lamp E and the pole 47 is completed. For the circuit on the lamp C, let us start at the switch-pole 48, and passing in succession through the wire 57, the lamp C, the return wire 58, the point 51, the wire 52, the point 53, the wire 54, the point 55, the wire 42, the battery 34, the wire 43, the wire 46, back to the switch 32.

In operation, let us assume that the bracket arm 15 is that of one attached to the rear of an automobile, and supporting the device on the lug 14 and the set screw 16. Also assume that the circuit of wires is diagrammatic of wires leading from two switches positioned within handy reach of the chauffeur in the front of the automobile. These switches being numbered 31 and 32. Suppose that the chauffeur desires to illuminate the rear tail danger signal having a red glass 26 and at the same time desires to illuminate the number plate 30, he closes the switch 31; which, by the circuit just described throws his battery current upon the lamps B and D. Now assume that he desires to give to anyone following his automobile, a warning that he is about to turn to the left, he will throw the switch 32 to close the circuit on the pole 47 and thus will illuminate the letter—L. Signifying, in advance, the chauffeur's intention to go to the left. If, on the contrary, he decides to go to the right, he throws the leaf 56 over in contact with the pole 48, and closes the circuit on the lamp C, in the rear of the letter R; at the same time cutting off the circuit on the lamp E. The letter R thus becomes illuminated, signifying the chauffeur's intention to go to the right.

In providing a reflector shield 28, in the shape that I do, I am also providing a rain shield to the number plate 30. The under side of the shield 28 is perferably painted white or perpared in some way to reflect light. This device is simple in its construction and cheap to make and is shaped to be ornamental as an attachment to the rear of the vehicle. The lamps are easily reached for repair or renewal by removing the screws from the lugs 10, 11, 12 and 13, to release the plate 1, upon which the lamps are supported, while the plate 1 remains secured to the bracket 15.

Having described my invention, I claim,

As an article of manufacture, an auto signaling box adapted for the reception of lamps, comprising a shell having a flat face with apertures forming signal characters, two opposite side faces, a bottom apertured face, for the reception of a lamp, and a top curved face, a plate fitting the open side of said shell, with means for attaching said plate to said shell, said plate having integral therewith, in its central portion, a square box having vertical and horizontal sides, the two vertical sides extending below the lower of the horizontal side, two inclined walls projecting divergently from the upper corners of said square box, the sides of said box and the said inclined walls dividing said shell into lamp compartments, a reflector hood mounted upon the under side of said shell, and means for attaching a name or number plate to the rear of said hood, upon said first mentioned plate.

LEON KOWALAK.